UNITED STATES PATENT OFFICE.

NANCY A. HUTCHINS, OF CHICAGO, ILLINOIS, ASSIGNOR OF ONE-HALF TO JOHN K. COMSTOCK, OF CHICAGO, ILLINOIS.

CLEANSING FLUID OR COMPOUND.

No. 930,965.  Specification of Letters Patent.  Patented Aug. 10, 1909.

Application filed November 16, 1906.  Serial No. 343,658.

*To all whom it may concern:*

Be it known that I, NANCY A. HUTCHINS, a citizen of the United States, residing at Chicago, in the county of Cook and State of Illinois, have invented certain new and useful Improvements in Cleansing Fluids or Compounds, of which the following is a full, clear, and exact specification.

This invention relates more particularly to a cleansing fluid for use in cleaning the grease and dirt or accumulated oil from engines and other machinery, and in fact from any device or article where such accumulation occurs, and it has for its primary object to provide an improved, simple, and efficient fluid or substance capable of readily removing dirt and oily matter without in the least injuring the surfaces upon which it is used or deteriorating the skin of the user where it comes into contact therewith.

It also has for its object to provide an improved cleansing fluid of this character which will be absolutely fireproof and non-combustible, and which may be washed out of the cloth or other material employed in its application.

With a view to the attainment of these ends and the accomplishment of certain other objects, which will hereinafter appear, the invention consists in the features of novelty which will now be fully described, and then more particularly pointed out in the claim.

This improved cleansing compound consists, essentially, of linseed oil, water, and silicate of soda, or liquid glass.

In preparing the fluid, five (5) gallons of distilled water, or other water free from deteriorating chemical ingredients, are added to one (1) gallon of raw linseed oil and four (4) pounds of silicate of soda or liquid glass. The silicate of soda is dissolved in the water, and the oil then added, and the whole violently agitated to cause them to combine or thoroughly intermingle, whereupon the solution is ready for use. The polishing qualities of the solution may be improved by the slight addition of oil, and its cleansing qualities improved by the addition of silicate of soda, if upon experiment it is found that the proportions above named do not give satisfactory results in either of these particulars. Any of the commercial forms of silicate of soda may be employed, but it is preferable to employ that which comes in the form of jelly. A cleansing compound thus made may be used freely upon paint or polished surfaces without fear of damage to the varnish or the paint surface, but, on the contrary, will preserve the paint. For cleaning grease and dirt and accumulated oil from engines and machinery it will be found to be of great value. Its chemical action destroys or dissolves the grease, and yet it does not injure the bright parts of the machinery. It will also be found of great benefit in washing the outside of passenger cars, for removing the grease and dirt, and when thus used it leaves the surface of the varnish or paint polished and free from corroding acids which are liable to destroy the varnish.

In the use of the fluid, a handful of waste, or any cloth or substance capable of being saturated with the fluid, is dipped into the fluid and squeezed out to rid it of the surplus. It is then rubbed over the surface which it is desired to cleanse, after which the surface is wiped dry with dry waste or a cloth, but not until the fluid is allowed an opportunity to cut and absorb the grease or soak through the dirt, which requires but a moment.

In order that the invention might be understood by those skilled in the art, the details of this embodiment thereof have been thus specifically described, but—

What I claim as new therein and desire to secure by Letters Patent is:

The herein described cleansing fluid consisting of raw linseed oil, distilled water and silicate of soda, substantially in the proportions of one gallon of the oil, five gallons of water and four pounds of the soda, said ingredients or materials being thoroughly intermingled.

In testimony whereof I have signed my name to this specification, in the presence of two subscribing witnesses, on this 14th day of November, A. D. 1906.

NANCY A. HUTCHINS.

Witnesses:
FRANCIS A. HOPKINS,
CHAS. H. SEEM.